US005253090A

United States Patent [19]

Yamazaki et al.

[11] Patent Number: 5,253,090

[45] Date of Patent: Oct. 12, 1993

[54] LIQUID CRYSTAL ELECTRO-OPTIC DEVICE WITH TWO MATERIALS DIFFERENT IN REFRACTIVE INDEX DISPERSED IN THE LIQUID CRYSTAL

[75] Inventors: Shunpei Yamazaki, Tokyo; Akira Mase, Kanagawa, all of Japan

[73] Assignee: Semiconductor Energy Laboratory Co., Ltd., Kanagawa, Japan

[21] Appl. No.: 766,284

[22] Filed: Sep. 27, 1991

[30] Foreign Application Priority Data

Oct. 1, 1990 [JP] Japan .................................. 2-264634

[51] Int. Cl.[5] ........................ G02F 1/13; G02F 1/1339

[52] U.S. Cl. ........................................ 359/52; 359/51; 359/81

[58] Field of Search .............................. 359/81, 51, 52

[56] References Cited

U.S. PATENT DOCUMENTS

| | | | |
|---|---|---|---|
| 4,165,157 | 8/1979 | Kobale et al. | 359/81 |
| 4,249,800 | 2/1981 | Spruijt | 359/81 |
| 4,435,047 | 3/1984 | Fergason | 359/51 |
| 4,950,052 | 8/1990 | Fergason et al. | 359/52 |
| 5,056,898 | 10/1991 | Ma et al. | 359/94 |
| 5,130,831 | 7/1992 | Kohara et al. | 359/81 |
| 5,178,571 | 1/1993 | Mase | 359/51 |

*Primary Examiner*—William L. Sikes
*Assistant Examiner*—Anita Pellman Gross
*Attorney, Agent, or Firm*—Sixbey, Friedman, Leedom & Ferguson

[57] ABSTRACT

A liquid crystal device comprising a liquid crystal electro-optic layer supported between a pair of substrates furnished with electrodes, provided that at least one of said substrates is transparent, characterized by that said liquid crystal electro-optic layer comprises a liquid crystal material, a first transparent material, and a second transparent substance whose refractive index is different from those of the liquid crystal material and the first transparent material is disclosed. The liquid crystal electro-optic layer may otherwise comprise a liquid crystal material and a mixed transparent substances provided that the refractive index thereof is controlled to be about the same as that of the liquid crystal material. The device has improved display contrast and is capable of an increase light transmittance to 4 times as large as that of a conventional one.

20 Claims, 2 Drawing Sheets

LIQUID CRYSTAL ELECTRO-OPTIC DEVICE WITH TWO MATERIALS DIFFERENT IN REFRACTIVE INDEX DISPERSED IN THE LIQUID CRYSTAL

BACKGROUND OF THE INVENTION

1. Field of the Invention

The present invention relates to an electro-optic device, more particularly, it relates to a device comprising a liquid crystal layer having a large display area, which is capable of providing an extended visual field and an animation. The liquid crystal device according to the present invention may be used for electric machines for office automation (OA), such as laptop personal computers.

2. Description of the Prior Art

Liquid crystal display devices heretofore put into practice include those using singly nematic liquid crystals, i.e., the TN (twisted nematic) mode or the STN (super-twisted nematic) mode liquid crystals. There is also proposed a device using a ferroelectric liquid crystal alone. However, the liquid crystal display devices mentioned hereinbefore use a polarizer sheet on the surface and the back of the device. Furthermore, those devices are provided with molecule-orienting films (orientation control films) on the electrodes of the devices. The molecule-orienting films are formed by an orientation treatment. On the other hand, there is also known a method of producing liquid crystal devices having high contrast without applying such molecular orientation treatments. The method comprises dispersing liquid crystals or liquid crystal granules in a polymer by granulating the liquid crystal, and then making a film of the resulting polymer. As the substrances for granulating, proposed are gelatin, gum arabic, poly vinyl alcohol, and the like as proposed in unexamined published Japanese patent application No. 58-501631 and U.S. Pat. No. 4,435,047. In this method, the granulated liquid crystal molecules arrange themselves along the electric field when an electric voltage is applied, and the display itself turns transparent if the refractive index of the liquid crystal agrees with that of the polymer. When the electric field is removed, the liquid crystal molecules recover the random orientation, and the display becomes opaque white because the light is dispersed at the boundary between the liquid crystal and the polymer due to the difference in refractive index between them.

However, since the liquid crystal device described above does not use the conventionally known polarizer sheets, the achievement of a sufficiently high contrast has been a great problem to be solved.

SUMMARY OF THE PRESENT INVENTION

An object of the present invention is to provide a liquid crystal device which overcomes the problem set forth hereinbefore.

The object of the present invention has been achieved by a device comprising a liquid crystal electro-optic layer (a composite of a liquid crystal and a transparent substance) being supported between a pair of substrates provided with electrodes thereon, wherein said liquid crystal electro-optic layer (referred to simply as 'electro-optic layer', hereinafter) comprises the liquid crystal and the transparent substance in a mixed state, provided that either of them is dispersed in the layer (that is, they constitute a disperse system). Furthermore, the present invention provides a liquid crystal device which provides a high contrast by increasing light transmittance, since it comprises a transparent substance composed of a composite of materials differed in refractive index, to thereby adjust the refractive index of the transparent substance to be about the same as that of the liquid crystal along the light transmitting direction upon applying an electric field to the liquid crystal. That is, the light transmittance is increased by making an apparent refractive index as composition of the refractive index of one component of the transparent materials and the refractive index of the other component of the transparent materials substantially equal to the refractive index of the liquid crystals. For this purpose, one component of the transparent materials has a refractive index different from that of the other component of the transparent materials and that of the liquid crystal material.

DETAILED DESCRIPTION OF THE PREFERRED EMBODIMENTS

The transparent substance for use in the present invention is a highly transparent resin, and in general, an organic resin is used. The organic resin may be an ultraviolet (UV)-curable resin, such as poly methyl methacrylate (PMMA). It is also effective to add a fluorine-containing compound which is a ferroelectric material, for example, polyvinylidene fluoride (1–100%), in the transparent substance to thereby adjust the refractive index of the transparent resin in such a way that it may coincide with that of the liquid crystal material upon applying an electric field.

The refractive index of the transparent substance can be adjusted to be substantially the same as that of the liquid crystal material by mixing transparent substances, as mentioned earlier, or by laminating a plurality of different transparent substances to obtain a synthesized refractive index which correspond to that of the liquid crystal. By this configuration, since the transparent substances (the different transparent substances) in combination have substantially the same effect upon light refraction as the liquid crystal material, light transmittance through the liquid crystal electro-optic layer is increased.

The composite transparent substance is mixed with the liquid crystal at the former to the latter ratio in the range of from 20/80 to 80/20 in weight ratio. The present invention can then be realized by applying an AC electric field to the electro-optic layer obtained in this way.

The present invention is now described in further detail by making reference to illustrative embodiments, but it should be understood that the present invention is not to be construed as being limited thereto.

Figure 1A:
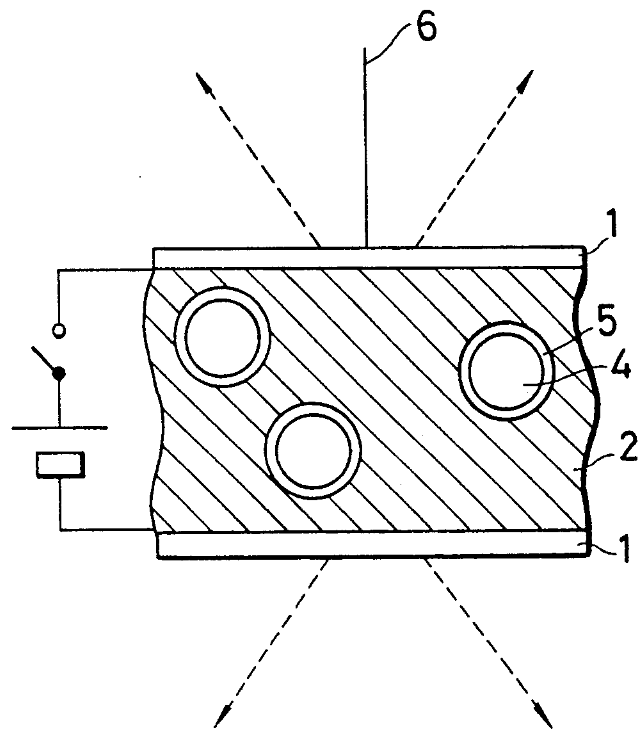
FIGS. 1(A) and 1(B) are schematic views of a liquid crystal device in accordance with a first preferred embodiment of the present invention, comprising substrates 1, liquid crystal 2, and translucent substances 4 and 5; light 6 is also shown in the FIGURES.
Figure 1B:
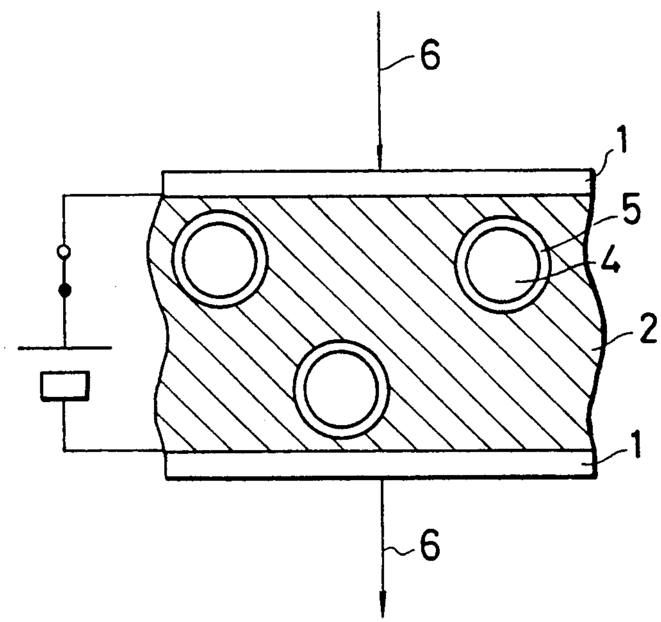

Referring to FIGS. 1(A) and 1(B), a liquid crystal electro-optic device in accordance with a first preferred embodiment of the present invention is explained below. A liquid crystal electro-optic layer was prepared using PMMA as the first transparent substance, a carbon film as the second transparent substance, and a liquid crystal as the liquid crystal material. The properties of the liquid crystal are described hereinafter. Minute particles 4 of PMMA from 1000 Å to 5 μm in size, preferably about 1 μm in size were prepared, and were coated with a carbon film 5 about 200 Å in thickness by a known plasma deposition process. The carbon-film 5 coated transparent substance thus obtained was then mixed with the liquid crystal 2, and after stirring, ultrasonics was applied thereto to obtain a mixture having the transparent substance uniformly dispersed therein. It was found that a more effective process comprises heating the electro-optic layer material to obtain an isotropic phase (liquid phase) liquid crystal, stirring, and applying thereto ultrasonics to disperse uniformly the carbon-film coated transparent substance in the liquid crystal, and cooling thereafter to a temperature at which the liquid crystal electro-optic layer exhibits liquid crystal characteristics.

A transparent glass substrate 1 provided with one of the electrodes thereon was then coated with the mixture of the liquid crystal and the transparent substance, and was laminated with the other substrate provided with the other electrode thereon with an alumina spacer (5 μm in diameter) having inserted therebetween. In FIGS. 1(A) and 1(B), the electrodes are omitted.

Instead of using the alumina spacers, a part of the first transparent substance may be substituted by particles having a diameter larger than that of the transparent substance. Such particles are surface-coated with an adhesive material as the second transparent substance, and the substrates are then laminated with the particles sandwiched therebetween to obtain a cell structure in which the particles function as a spacer.

The liquid crystal device thus fabricated comprises a randomly oriented liquid crystal if no voltage is applied between the electrodes provided on the upper and lower substrates as shown in FIG. 1(A); thus, light 6 is scattered in this case. Once a voltage is applied to the electrodes as shown in FIG. 1(B), the liquid crystal takes a particular arrangement oriented to one direction according to the direction of the electric field, and generates an electro-optic effect. Thus, the light is transmitted in this case. Under an electric field, as is shown in FIG. 1(B), if the refractive index of the liquid crystal 2 along the direction of light transmittance becomes equal to that of the transparent substance, a maximum amount of light can be transmitted.

The liquid crystal material used in the first preferred embodiment comprises at least an ester type ferroelectric liquid crystal material, having a phase transition series of Iso-SmA-SmC*-Cry. The transition temperatures thereof are given below:

Iso—SmA—SmC*—Cry 38.7° C. 36.7° C. 0° C.

This liquid crystal has a positive dielectric anisotropy with an optical anisotropy, i.e., an anisotropy of the refractive index, Δn, of about 0.2.

Figure 2:
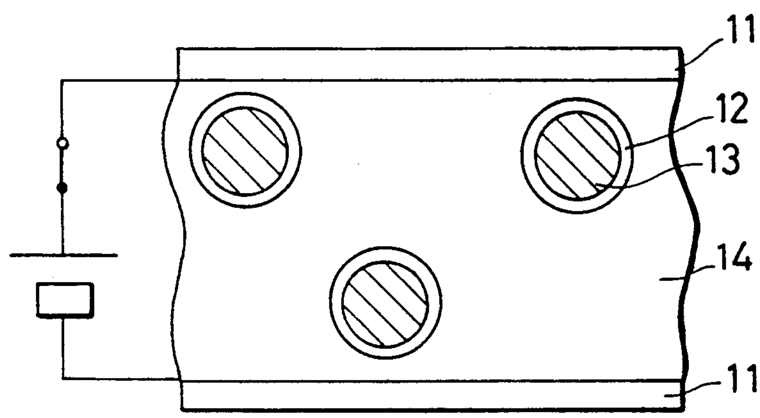
FIG. 2 is a schematic view showing a liquid crystal device in accordance with a second preferred embodiment of the present invention.

Referring now to FIG. 2, a liquid crystal electro-optic device in accordance with a second preferred embodiment of the present invention is illustrated therein. The device comprises a pair of substrates 11, a liquid crystal 13, an organic resin 14, and a material 12 covering the liquid crystal 13 and having a refractive index different from that of the liquid crystal 13 and that of the organic resin 14.

There is no particular restriction with respect to the liquid crystal to be used in the present invention; TN mode liquid crystals, nematic liquid crystals, smectic liquid crystals, and cholesteric liquid crystals as well as the ferroelectric liquid crystals may be used, and other liquid crystals as well. A dye may be added to the liquid crystal. The present invention provides an liquid crystal device which yields an increased light transmittance 4 times as large as that of the conventional TN mode liquid crystal devices using polarizer sheets, since no polarizer sheets are used in the liquid crystal device in accordance with the present invention.

Furthermore, the liquid crystal device according to the present invention provides a favorable display without using a back light, since the contrast of light transmittance and the non-transmittance is improved.

While the invention has been described in detail and with reference to specific embodiments thereof, it will be apparent to one skilled in the art that various changes and modifications can be made therein without departing from the spirit and scope thereof.

What is claimed is:

1. A liquid crystal electo-optic device comprising:

a pair of substrates provided with electrodes thereon, at least one of said substrates being transparent; and a liquid crystal electro-optic layer comprising liquid crystal, a first transparent substance, and a second transparent substance;

wherein said second transparent substance has a refractive index different from that of said first transparent substance and that of said liquid crystal and the first transparent substance is coated with the second transparent substance to form transparent particles which are dispersed in the liquid crystal.

2. The liquid crystal electro-optic device of claim 1 wherein said first transparent substance and said second transparent substance in combination have substantially the same effect upon light refraction as said liquid crystal when applying an electric field to said layer.

3. The liquid crystal electro-optic device of claim 1 wherein said liquid crystal comprises liquid crystal selected from the group consisting of ferroelectric liquid crystal and TN liquid crystal.

4. The liquid crystal electro-optic device of claim 1 wherein the weight ratio of said first and second transparent substances to said liquid crystal is 20/80 to 80/20.

5. The liquid crystal electro-optic device of claim 1 wherein said first transparent substance comprises poly methyl methacrylate.

6. The liquid crystal electro-optic device of claim 1 wherein said liquid crystal, said first transparent substance, and said second transparent substance constitute a disperse system.

7. The device of claim 1 wherein the particles are colorless.

8. The device of claim 1 wherein a diameter of said particles is less than a spacing between said substrates, and said particles are uniformly dispersed in said liquid crystal.

9. A liquid crystal electro-optic device comprising:

a pair of substrates provided with electrodes thereon, at least one of said substrates being transparent; and a liquid crystal electro-optic layer comprising liquid crystal, a first transparent substance, and a second transparent substance;

wherein said second transparent substance has a refractive index differet from that of said transparent substance and that of said liquid crystal.

wherein said first transparent substance comprises poly methyl methacrylate and said second transparent substance comprises carbon.

10. The liquid crystal electro-optic device of claim 9 wherein said first transparent substance is coated with said second transparent substance.

11. A liquid crystal electo-optic device comprising:

a pair of substrates provided with electrodes thereon, and spaced with a predetermined spacing, at least one of said substrates being transparent; and a liquid crystal electro-optic layer provided between said substrates and comprising liquid crystal and transparent regions dispersed in said liquid crystal, said regions comprising first transparent substances and second transparent substances covered with said first transparent substances;

wherein said first transparent substances have a refractive index different from that of said liquid crystal and that of said second transparent substances, a diameter of said regions is less than said spacing between said substrates, and the regions are uniformly dispersed in the liquid crystal.

12. The liquid crystal electro-optic device of claim 11 wherein said liquid crystal comprises liquid crystal selected from the group consisting of ferroelectric liquid crystal and TN liquid crystal.

13. The liquid crystal electro-optic device of claim 11 wherein the weight ratio of said first and second transparent substances to said liquid crystal is 20/80 to 80/20.

14. The liquid crystal electro-optic device of claim 11 wherein said at least one of said substrates is a glass substrate.

15. The liquid crystal electro-optic device of claim 11 wherein, said second transparent substances comprise poly methyl methacrylate.

16. The liquid crystal electro-optic device of claim 11 wherein an apparent refractive index as composition of said refractive index of said first transparent substances and the refractive index of said second transparent substances is substantially equal to the refractive index of said liquid crystal when applying an electric field to said layer.

17. A liquid crystal electro-optic device comprising:

a pair of substrates provided with electrodes thereon, at least one of said substrates being transparent; and a liquid crystal electro-optic layer provided between said substrates and comprising liquid crystal and regions dispersed in said liquid crystal, said regions comprising first transparent substances and second transparent substances covered with said first transparent substances;

wherein said first transparent substances have a refractive index different from that of said liquid crystal and that of said second transparent substrates and said first transparent substances comprises carbon.

18. A liquid crystal electro-optic device comprising:

a pair of substrates provided with electrodes thereon, at least one of said substrates being transparent; and a light modulating layer disposed between said pair of substrates and comprising a first transparent substance, a liquid crystal material dispersed in the form of plural particles in said substance, and a second transparent substance disposed between said first transparent substance and said liquid crystal material;

wherein refractive indices of said first and second transparent substances are different from each other and a refractive index synthesized by the first and second transparent substances is approximately the same as the refractive index of said liquid crystal material when an electric field is applied thereto.

19. The liquid crystal electro-optic device of claim 18 wherein said liquid crystal comprises liquid crystal selected from the group consisting of ferroelectric liquid crystal and TN liquid crystal.

20. The liquid crystal electro-optic device of claim 18 wherein said at least one of said substrates is a glass substrate.

* * * * *